March 27, 1945. L. C. UREN 2,372,461
APPARATUS FOR PLACING GRAVEL IN WELLS
Filed March 26, 1942 2 Sheets-Sheet 1

LESTER C. UREN
INVENTOR

BY
HIS ATTORNEY

March 27, 1945. L. C. UREN 2,372,461
APPARATUS FOR PLACING GRAVEL IN WELLS
Filed March 26, 1942 2 Sheets-Sheet 2
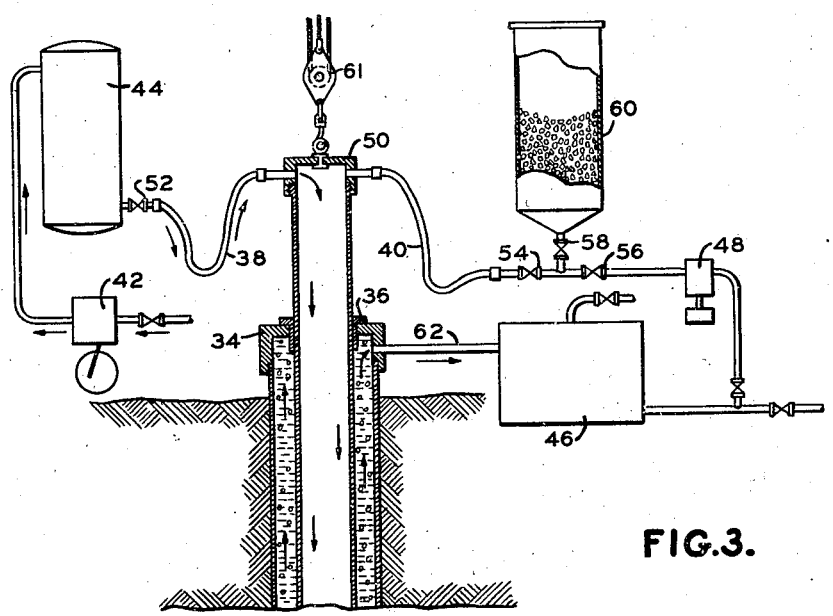
FIG.3.
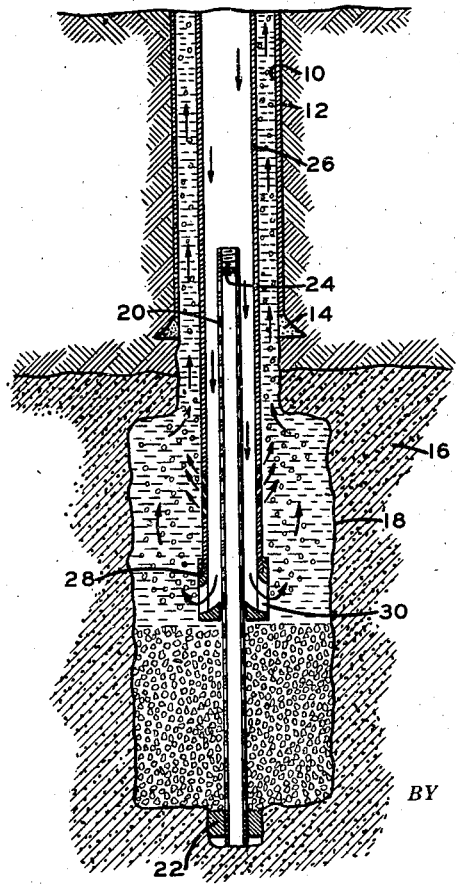
LESTER C. UREN
INVENTOR
BY R. J. Dearborn
HIS ATTORNEY Patented Mar. 27, 1945

2,372,461

UNITED STATES PATENT OFFICE 2,372,461

APPARATUS FOR PLACING GRAVEL IN WELLS

Lester Charles Uren, Berkeley, Calif., assignor to The Texas Company, New York, N. Y., a corporation of Delaware Application March 26, 1942, Serial No. 436,246

1 Claim. (Cl. 166—1)

This invention relates to the graveling of wells and more particularly to an apparatus for placing gravel or other insoluble granular material in the producing zone or cavity of an oil well bore hole. The principal object of the invention is to provide a method and means for circulating granular material into the desired position in a bore hole without the necessity of placing high pressures on the producing formation through the liquid used for circulating the granular material.

A variety of methods have been proposed and developed for placing gravel in wells drilled to produce oil, gas and water. These methods have as their objective, filling with gravel the space between the wall of the well and a perforated liner or screen pipe where it extends through the productive formation. Gravel envelopes or packs, so provided, restrain influx of sand and detrital material, prevent caving of the walls and increase the productive capacity and efficiency of operation of wells.

Methods thus far employed in placing gravel in deep-seated producing formations, involve circulating the gravel into the well cavity, using liquids such as clay-laden fluids, water or oil as placement or carrier media that fill the well to the surface. Because of the high hydrostatic pressure developed at great depths against the wall of the well by the liquid placement medium, there is a tendency for the fluid to penetrate the walls of the well and enter the productive formations, often driving away from the well the oil, gas or water which it is desired to produce. Where a clay-laden fluid is used, as a result of such infiltration into the productive formation, a deposit of clay is formed on the wall of the well which may clog the pores of the reservoir rock and prevent or restrict subsequent flow from the productive formation into the well. Such a mud sheath is often impossible to remove because of the difficulty of gaining access to the wall of the well through the intervening gravel. Loss of circulating fluid to the producing formation and accumulation of thick mud sheaths on the walls of the well are likely to be particularly troublesome in very permeable, partially depleted formations in which the residual reservoir pressure is low. In such cases, the fluid used in placing the gravel in the well may enter the productive formation so rapidly that it becomes impossible to secure circulation of the placement medium back to the surface. Another disadvantage of present methods of graveling is that the well must be "killed"—i. e., flow from the productive formation into the well must be stopped while the graveling operations are in progress.

It is the purpose of this invention to provide a means of placing gravel in well cavities that will function with bottom-hole pressures materially lower than are possible by present-used methods, thus restricting movement of the placement medium through the wall of the well into the productive formation and avoiding accumulation of thick adherent clay sheaths on the wall of the well. By use of the method proposed, it is possible to secure circulation of the carrier or placement liquid back to the surface, even in cases where the productive formation is highly permeable and of low residual pressure. Furthermore, lower pressure may be maintained in the well than in the adjacent productive formation, so that fluid may flow from the reservoir rock into the well, even while the gravel is being placed in the well cavity.

In accordance with the invention, the unique feature of the method consists in the combined or alternating use of a compressed gas in conjunction with the liquid employed as a gravel carrier or placement medium. Both fluids traverse the same channels of circulation through the well. The function of the liquid is to carry the gravel to its ultimate position in the well cavity and the function of the gas is to lift the liquid placement medium to the surface. The quantities of gas and liquid employed are so proportioned that the average density of the ascending stream of mixed liquid and gas is much lower than the density of the liquid alone; consequently, the maximum pressure attained in the well cavity is materially lower than if circulation back to the surface were attained by use of the liquid alone.

For a better understanding of the invention, reference may be had to the accompanying drawings in which:

Figure 3 is a view similar to Figure 1 but showing the aeration and removal of the carrier liquid.

Figures 1, 2:
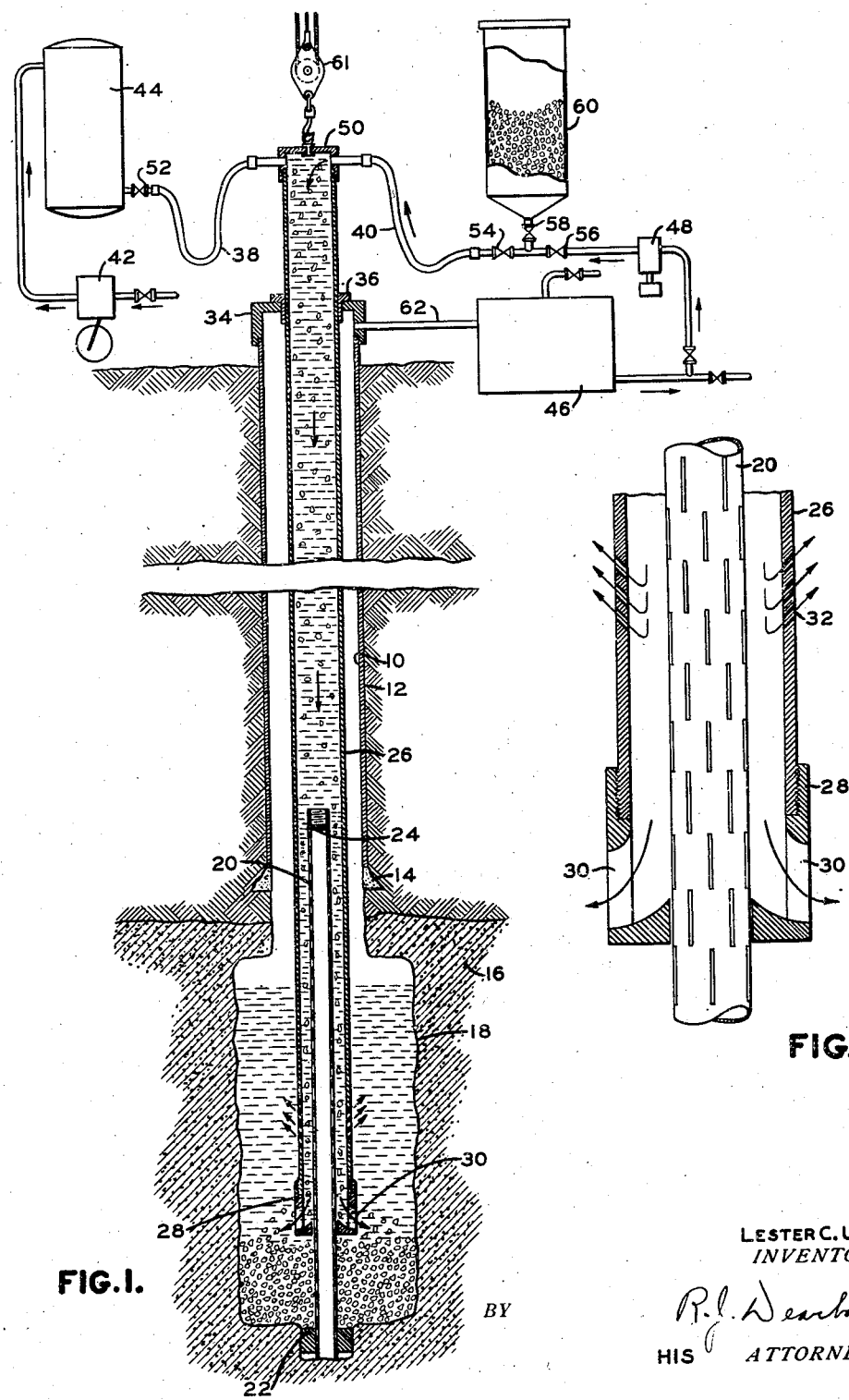
Figure 1 is a vertical sectional elevation through a well and equipment at the surface for placing gravel in the well bore.
Figure 2 is an enlarged vertical elevation, partly in section, showing a detail.

As shown in Figure 1, a well bore 10 is shown as lined with a casing 12 which is cemented at 14 to the walls of the well a short distance above the oil sand 16 from which production is to be obtained. By mechanical or hydraulic means, or with the aid of explosives, the bore of the well has been enlarged where it penetrates the reservoir rock forming a well cavity 18 with approximately cylindrical walls through which oil and accompanying gas must pass in gaining admission to the well from the formation. From the surface a column of perforated liner or screen pipe 20 of such length as to extend from the bottom of the well cavity to a point above the lower end of the casing 12 is projected into the well, suspended on the lower end of a column of tubing, not shown. The perforated liner 20 is of external flush-jointed construction so that it presents a smooth exterior surface and may be connected to the tubing on which it is lowered by any suitable disengageable means, such as a left-hand threaded connection, so that after the liner is in position in the well cavity the tubing may be detached by turning to the right, leaving the liner in the cavity as shown in Figure 1. To facilitate this operation the liner 20 may be equipped at its lower end with a packer 22 which may be set against the wall of the well thus preventing the liner from turning when the lowering tubing is detached, and holding it firmly during the subsequent graveling operation. The upper end of the perforated liner 20 is closed as by a drillable metal plug 24 which can be drilled out after the graveling operation is completed.

Concentric with the liner 20 and of somewhat larger diameter, a second column of tubing such as light casing 26 is projected downwardly from the surface into the well cavity 18. As is shown more clearly in Figure 2, the lower end of the column 26 is equipped with a foot-piece 28 which closes the lower end of the column and fits snugly over and around the exterior surface of the liner 20, yet is free to move up and down and to turn thereon. The foot-piece 28 is provided with one or more openings shaped in the form of nozzles 30 large enough to allow free passage of the fluids and gravel in circulation. At some distance above the foot-piece 28 a series of small holes 32 are provided through the wall of the tubing 26 and preferably inclined upwardly, as shown in Figure 2.

At the surface, the annular space between the well casing 12 and the tubing 26 is closed by a gas-tight casing-head 34 incorporating a packed gland 36 through which the tubing 26 may be moved up or down. To permit of this vertical movement of the tubing 26 the upper few lengths of the tubing may be connected with external flush-joints so that the tubing will present a smooth exterior surface. Connected through one or more side outlets in the tubing cap 50 by flexible connections 38 and 40 is a source of compressed gas supplied from a gas compressor 42 through a receiver 44 and a source of circulating liquid, such as crude petroleum, water or drilling fluid, in which gravel particles may be entrained. The liquid is forced from a storage tank 46 by a pump 48 through the flexible connection 40 into the upper end of the tubing 26 which upper end is closed by means of a suitable cap 50. A valve 52 is provided in the gas line leading to the tubing 26 and valves 54 and 56 are provided in the discharge line from the pump 48. A valved connection 58 leads from the pump discharge line to a suitable container or hopper 60 so that gravel particles may be fed into the liquid being pumped into the upper end of the tubing 26. A pressure regulator and volume control device, not shown, may be desirable in the flow line 38 leading from the compressed gas receiver 44 to the upper end of the tubing 26.

The tubing string 26 is arranged so that it may be raised or lowered through the casing head by any suitable suspending mechanism such as hoisting block 61 suspended in a derrick, not shown, in a manner well known to those versed in the art.

With the apparatus assembled as described, the well cavity reamed to suitable size, the liner 20 placed in the cavity, a source of natural gas connected with the gas compressor 42, a supply of oil or other carrier liquid in the storage tank 46, and a supply of gravel of suitable size in the gravel container 60, tubing column 26 is lowered about the perforated liner 20 until the foot-piece 28 is near the bottom of the well cavity. A flow of oil is then established down through the tubing 26 and through the annular space between the tubing 26 and the liner 20, from the storage tank 46 with the aid of the pump 48. When the tubing 26 is filled with carrier liquid and sufficient of the liquid has flowed out through the openings 30 in the foot-piece 28 to submerge the foot-piece in the well cavity, the valve 58 controlling the flow of gravel from the gravel container 60 is opened and gravel added to the liquid stream at this point flows down with the liquid through the tubing 26 and between the tubing 26 and the liner 20 and is ejected through the nozzle openings 30 into the well cavity 18. The gravel particles being of materially higher density than the carrier liquid will settle through the latter to the bottom of the well cavity.

After a suitable quantity of gravel has been deposited in the well cavity the supply of gravel is cut off by closing the valve 58 but flow of liquid is continued for a time until all gravel has been ejected from the foot-piece 28 and has had time to settle into the well cavity below. Flow of carrier liquid is now stopped and, as is shown in Figure 3, a flow of compressed gas or air is established from the receiver 44 down through the tubing string 26 and into the well cavity through openings 30 and 32. As the liquid in the well cavity becomes aerated by occlusion of compressed gas and the latter expands upwardly into the annular space between the tubing 26 and the well casing 12, the gas functioning as a gas-lift or ejector will lift the oil through this annular space, eventually discharging it at the surface through the pipe 62 connecting the upper end of the casing to the storage tank 46. If it be desired to conserve the gas, the fluid mixture may, of course, be led through a suitable oil and gas separator between the well head and the storage tank. Flow of compressed gas is allowed to continue until but little oil is reaching the surface. The tubing string 26 is then raised so that the foot-piece 28 is at a somewhat higher elevation in the well cavity 18 while the liner 20, of course, remains stationary. Flow of carrier liquid down through the tubing 26 to the well cavity is again established, gravel being added to the stream, and the entire cycle of operations as described is repeated. Gravel container 60 must, of course, be occasionally refilled or two containers may be used alternately, each suitably manifolded to the oil line. By successive repetition of the above-described procedure, gravel is deposited layer on layer in the well cavity about the perforated liner 20 until the annular space between it and the wall of the well cavity is filled and the foot-piece 28 has been lifted into the well space above the upper end of the liner. Connections at the well head may now be broken and the tubing string 26 withdrawn from the well leaving the liner 20 embedded in its gravel envelope or pack, later perhaps to receive an oil well pump lowered on tubing from the surface after drilling out the plug 24. If desired, a suitable packer may be set between the upper end of the liner 20 and the lower end of the casing 12 and the plug 24 drilled out so that oil from the formation 16 will pass more or less radially through the gravel and into the liner from which it will flow upwardly to the surface through the casing 12.

Although, by way of example, a definite arrangement of equipment and method of procedure has been described for placing gravel in the well cavity, it is not intended to imply that such arrangement and procedure are the only means by which deposition of gravel may be accomplished while still adhering to the broad method of this invention. For example, by careful control of pressures, the compressed gas and the liquid-carrying gravel may flow together simultaneously down into the well cavity while the tubing string 26 is gradually raised, thus employing a continuous process of gravel deposition instead of the intermittent method which has been described. Although a process of "direct circulation" has been described in which the flow is down inside of a column of tubing, returning to the surface through the annular space about the tubing, the method of the invention may also be applied by "reverse circulation" in which the flow is downward through the annular space between the tubing 26 and the casing 12 while the fluids return to the surface through the interior of the column 26. Again, in this last-mentioned "reverse circulation" method the liquid and gas may be forced alternately or simultaneously downwardly to the well cavity, the fluids passing upwardly through the tubing 26.

Consideration of the method of gravel placement herein described will lead to the conclusion that it may readily be applied to oil, gas, or water wells immediately upon completion of the original drilling or at any subsequent time. The special equipment necessary may be mounted on motor trucks or tractors and brought to the well and quickly rigged with but little delay or interruption in production. Indeed, production may continue while the work is in progress, oil and gas flowing from the reservoir rock into the well cavity being ejected with that used to place the gravel by the expansive force of the compressed gas forced down from the surface. Knowledge gained in operation of gas lifts indicates that fluids may be lifted from deep wells with bottom-hole pressures of but a few hundred pounds, often less than the prevailing pressures in the adjacent producing formations. Thus, wells may be graveled with a minimum interruption in service, with no infiltration of foreign fluids into the producing rocks and with no accumulation of clay in the pores of the walls of the well cavities to restrict future production. Proper control of ascending velocity of the gas-oil mixture will exercise a selective action on the gravel and detrital material that may cave from the walls of the well while the gravel is being introduced. The larger gravel particles settle to the bottom of the well cavity, while the finer detrital material is swept upwardly to the surface in suspension in the gas-oil mixture. Thus a gravel envelope or pack free of occluded detrital material is the result.

Obviously many modifications and variations of the invention, as hereinbefore set forth, may be made without departing from the spirit and scope thereof, but only such limitations should be imposed as are indicated in the appended claim.

I claim:

An apparatus for placing granular material in a well having a well cavity and a perforated liner projecting upwardly through said cavity into the lower end of the well bore, comprising means for temporarily closing the top of said liner, a string of tubing projecting downwardly into said cavity, a foot piece on the bottom of said tubing string and adapted to have sliding engagement with the exterior of said liner, said foot piece being provided with at least one aperture opening into said cavity, means at the surface for pumping a mixture of a liquid and granular material downwardly through said tubing and out through said aperture so that the granular material will settle in said cavity, and means for forcing gas downwardly through said tubing and out through said aperture to aerate the liquid during its upward travel between the tubing string and the walls of the hole.

LESTER C. UREN.